Patented Apr. 26, 1949

2,468,606

UNITED STATES PATENT OFFICE 2,468,606

PROCESS FOR MAKING ISODIBENZANTHRONE

Mario Scalera and Warren S. Forster, Somerville, N. J., assignors to American Cyanamid Company, New York, N. Y., a corporation of Maine No Drawing. Application December 23, 1946, Serial No. 718,122

4 Claims. (Cl. 260—358)

This invention relates to an improved process for the preparation of isodibenzanthrone.

Isodibenzanthrone, which is used extensively in the preparation of vat dyes, for example, dichlor-isodibenzanthrone, has been prepared by various methods. Among some of the better methods is that involving the fusion of Bz-1-Bz-1'-dibenzanthronyl sulfides and selenides in an alcoholic caustic potash solution. This process, while useful, suffers from a number of important practical disadvantages. In the first place, it is necessary to use potassium hydroxide as sodium hydroxide is not operative, and the potassium hydroxide has to be used in very large amounts. This results in a costly process. Another disadvantage lies in the fact that the alcohol used is critical, ethanol being about the only one which can be used practically as higher alcohols give much less favorable results. The fact that higher alcohols cannot be used is a disadvantage because of the low boiling point of the ethanol.

According to the present invention it has been found that if alkali metal alkoxides are used instead of potassium hydroxide, yields are better, the amount of alkoxide is much less, sodium alkoxides may be used as well as potassium alkoxides, and are in fact preferred, and the alcohol is not critical. Any of the lower monohydric aliphatic alcohols having less than six carbon atoms may be employed. These advantages all make the process cheaper and more satisfactory because of its flexibility both with regard to the alkali metal alkoxide and to the alcohol. It is not even necessary that the alkoxide portion of the molecule corresponds to the solvent alcohol used.

While the exact reaction mechanism has not been completely proven, and it is not desired to limit the invention by any particular chemical theory, we believe that the improved results of the present invention are most probably due to a different reaction mechanism. The evidence is strongly in favor of this hypothesis because in the old process potassium hydroxide and sodium hydroxide were in no sense equivalents, whereas the corresponding alkoxides in the present process are. In fact, in the old process sodium hydroxide could not be used at all, whereas in the present process sodium alkoxides are just as good as potassium alkoxides and are in fact preferred because of their lower cost. The fact that higher alcohols such as propyl, butyl, isobutyl and amyl alcohols may be used is also a strong indication that the reaction mechanism must proceed in a different manner because with potassium hydroxide only ethanol is useful.

While it is an advantage of the present invention that the amount of alkali metal alkoxide required is much smaller than the amount of potassium hydroxide used in the prior art processes, it is in no sense used as a catalyst. The alkali metal alkoxide appears to be one of the reactants and must be used in amounts in excess of stoichiometrical equivalents to the benzanthronyl sulfide or selenide. However, this excess is much smaller than that required with potassium hydroxide, and when the preferred modification of the present invention is used employing sodium alkoxides, the unit cost of the alkoxide is much less. A marked saving on reagents is effected and at the same time the reduction of the large amount of excess potassium hydroxide required in the processes of the prior art increases the output for a given size of reactor.

A further advantage of the present invention is that the amount of alcohol used at the start can be substantially that which is required throughout the reaction. In the old processes using potassium hydroxide it was a sufficiently fluid reaction mixture at the start of the reaction. This amount of alcohol was more than that necessary to maintain fluidity after the reaction mixture had been brought to reaction temperature and it was therefore necessary to distill off part of the alcohol. This step of distilling off unneeded alcohol excess is avoided by the present invention, and constitutes an additional practical operating advantage of the present invention.

The fact that the alkali metal alkoxide need not be derived from the same alcohol which is used as a solvent is a practical operating advantage because it adds a valuable flexibility to the process, allowing a free choice of the solvent, which need be dictated only by question of temperature control and economy. At the same time the temperature necessary for the reaction is lower than that required with alkali metal hydroxides, an additional piece of evidence which indicates that the reaction mechanism in the two processes is not the same. The alkali metal alkoxide may be prepared in various ways, for example, free alkali metal may be dissolved in the alcohol used in the melt, or commercially available alkali metal alkoxides such as sodium methoxide may be used. They are simply added to the reaction mixture and dissolved in the alcohol used as a solvent.

Sometimes improved yields in a process are accompanied by other disadvantages in the way of the nature of impurities. In the present case, however, the isodibenzanthrone produced is not only obtained in higher yields but is of markedly higher quality and purity. In fact, in many cases it is so pure that it may be used directly in the preparation of dyestuffs without further purification. For instance, the dyestuff produced by the chlorination of the crude isodibenzanthrone obtained by the present process is a product of superior quality and has the advantage that its shade tends toward the red, which is an important and desirable practical property in this type of dye. The possibility of eliminating a step of purification, which is an advantage of the preferred modification of the present invention, constitutes additional economic savings.

The invention will be illustrated in greater detail in connection with the following specific examples, the parts being by weight.

Example 1

A slurry is made by adding 97 parts of sodium methoxide to about 225 parts of isobutyl alcohol. This mixture is heated at the boil for about forty minutes. Forty-nine parts of Bz-1-Bz-1'-dibenzanthronyl sulfide is added and the temperature is maintained at 115-120° C. until the reaction is substantially complete. About 400-500 parts of water is added, and the mixture is distilled until all the alcohol has been removed. The dark-purple slurry is then aerated at the boil until oxidation is complete. The slurry is filtered and the filter cake washed and dried. A very high yield of isodibenzanthrone, containing only very little dibenzanthrone, is obtained. The yield of isodibenzanthrone is best determined by chlorination to produce the dichloro-isodibenzanthrone and determining the yield from the amount of dye produced. In this example the yield of dye was 81% based on the amount of sulfide used.

Example 2

Thirty-five parts of sodium is dissolved in about 300 parts of isobutyl alcohol. To the refluxing solution is added 49 parts of Bz-1-Bz-1'-dibenzanthronyl sulfide. The reaction mixture is maintained at 125-130° C. until the reaction is substantially complete. About 400-500 parts of water is added and the mixture distilled until all the alcohol has been removed. The slurry is then aerated at the boil until oxidation is complete. The slurry is filtered and the filter cake washed and dried. A good yield of high quality isodibenzanthrone is obtained. When the isodibenzanthrone was chlorinated, a pure dyestuff was obtained in a yield of 82% overall from sulfide to dyestuff.

When the above reaction is carried out with Bz-1-Bz-1'-dibenzanthronyl sulfide using potassium hydroxide in isobutyl alcohol as a condensing agent, a yield of only 64% of dye was obtained.

Example 3

Twenty-four parts of sodium is dissolved in about 87 parts of absolute ethyl alcohol. To this solution is added 10 parts of Bz-1-Bz-1'-dibenzanthronyl sulfide. The reaction mixture is maintained at 135-140° C. until the reaction is substantially complete. About 100 parts of water is added and the dark slurry aerated at the boil. The mixture is filtered and the filter cake washed and dried. When the isodibenzanthrone cake was chlorinated to dichloro-isodibenzanthrone, a yield of 86% was obtained.

When the above reaction is carried out using sodium hydroxide in ethanol as the condensing agent, a dye yield of about only 50% is obtained.

Example 4

About twenty parts of potassium is dissolved in about 87 parts of absolute ethyl alcohol. With the mixture at a temperature at 60-70° C., 10 parts of Bz-1-Bz-1'-dibenzanthronyl sulfide is added. A temperature of 135-140° C. is maintained until the reaction is substantially complete. About 100 parts of water is then added and the slurry aerated at the boil. The slurry is filtered, and the filter cake washed and dried. When this cake was converted by chlorination to dichloro-isodibenzanthrone, a yield of 80% was obtained.

We claim:

1. A process for producing isodibenzanthrone which comprises heating at elevated temperatures, a mixture whose sole significant ingredients are Bz-1-Bz-1'-dibenzanthronyl sulfide, alkali metal alkoxide and an aliphatic alcohol containing not more than six carbon atoms, the alkali metal being present in excess of two mols per mol of sulfide.

2. A process for producing isodibenzanthrone which comprises heating at elevated temperatures a mixture whose sole significant ingredients are Bz-1-Bz-1'-dibenzanthronyl sulfide, sodium methoxide and isobutyl alcohol, the sodium being present in excess of two mols per mol of sulfide.

3. A process for producing isodibenzanthrone which comprises heating at elevated temperatures a mixture whose sole significant ingredients are Bz-1-Bz-1'-dibenzanthronyl sulfide, sodium isobutoxide and isobutyl alcohol, the sodium being present in excess of two mols per mol of sulfide.

4. A process for producing isodibenzanthrone which comprises heating at elevated temperatures a mixture whose sole significant ingredients are Bz-1-Bz-1'-dibenzanthronyl sulfide, sodium ethoxide and ethyl alcohol, the sodium being present in excess of two mols per mol of sulfide.

MARIO SCALERA.
WARREN S. FORSTER.

REFERENCES CITED

The following references are of record in the file of this patent:

UNITED STATES PATENTS

| Number | Name | Date |
|---|---|---|
| 1,580,062 | Luttringhaus et al. | Apr. 6, 1926 |
| 1,725,590 | Luttringhaus et al. | Aug. 20, 1929 |
| 1,954,482 | Knowles | Apr. 10, 1934 |

FOREIGN PATENTS

| Number | Country | Date |
|---|---|---|
| 339,954 | Great Britain | Dec. 11, 1930 |